Feb. 26, 1957  F. M. F. HEREDIA  2,782,729
ARTICULATED RAILWAY TRAINS
Filed Oct. 15, 1952  6 Sheets-Sheet 1

INVENTOR
Francisco M. F. Heredia
BY
Byerly, Townsend & Watson
ATTORNEYS

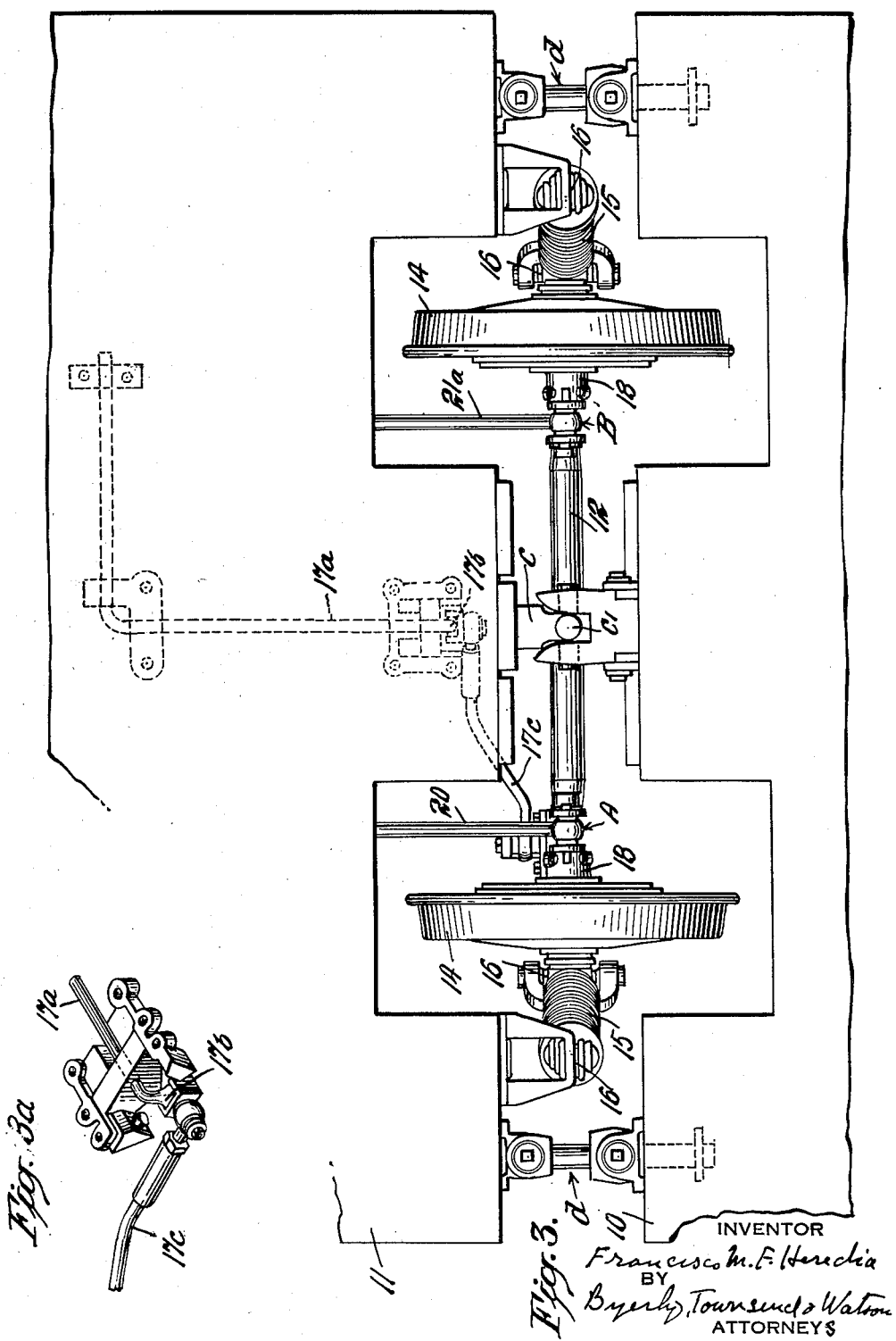

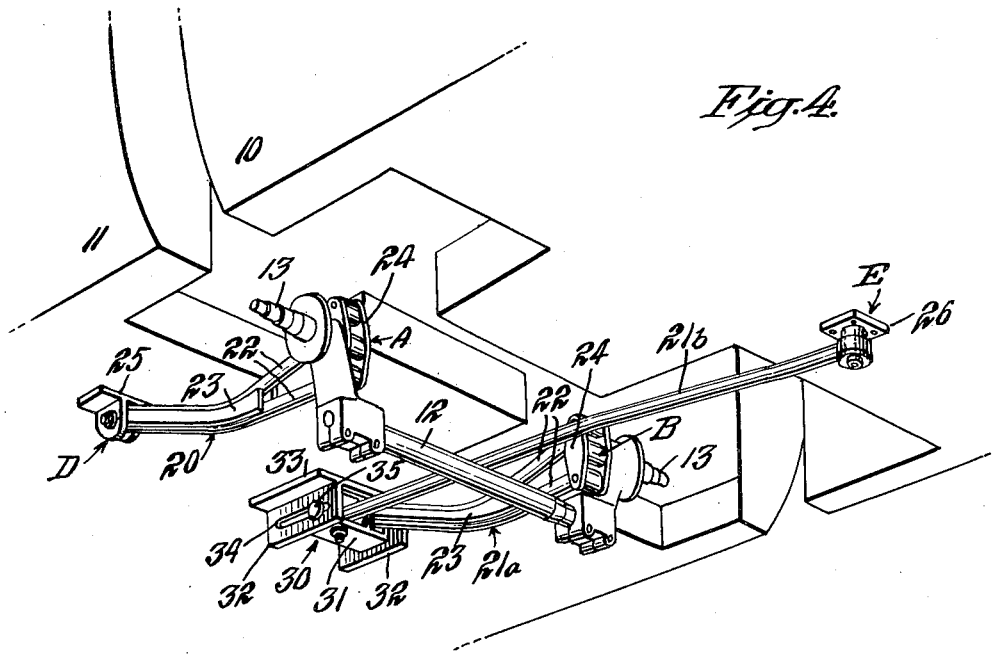
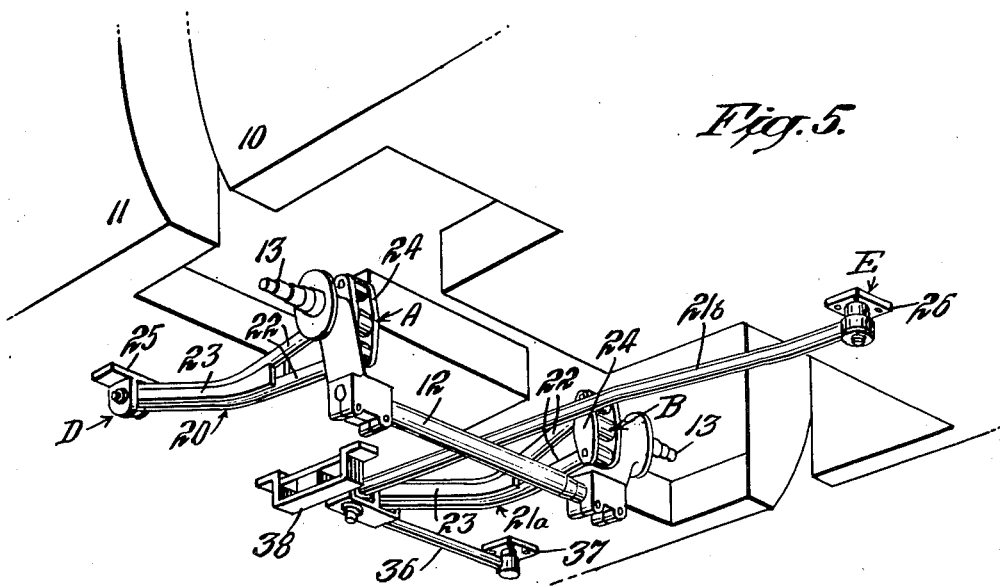

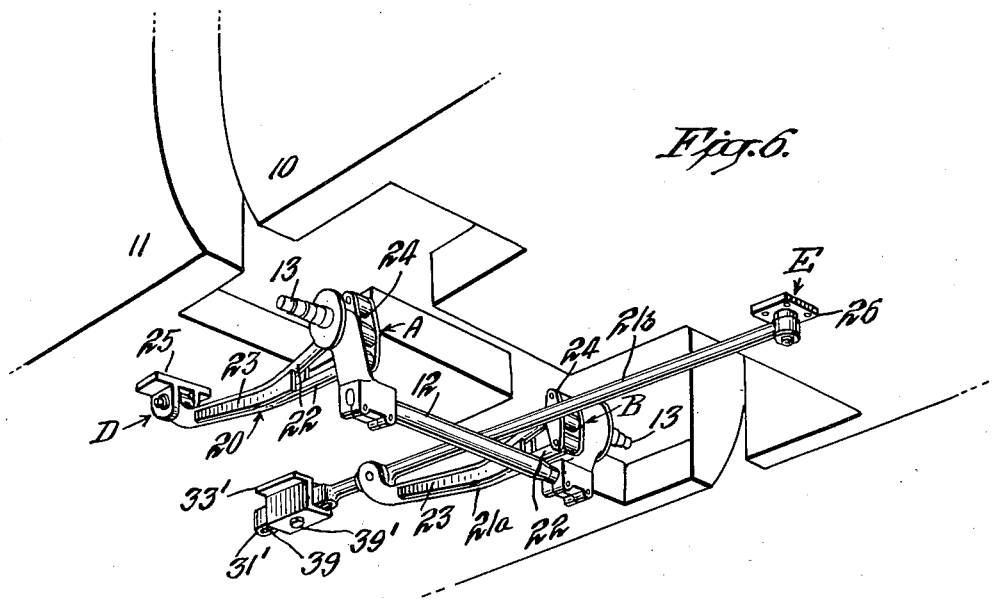
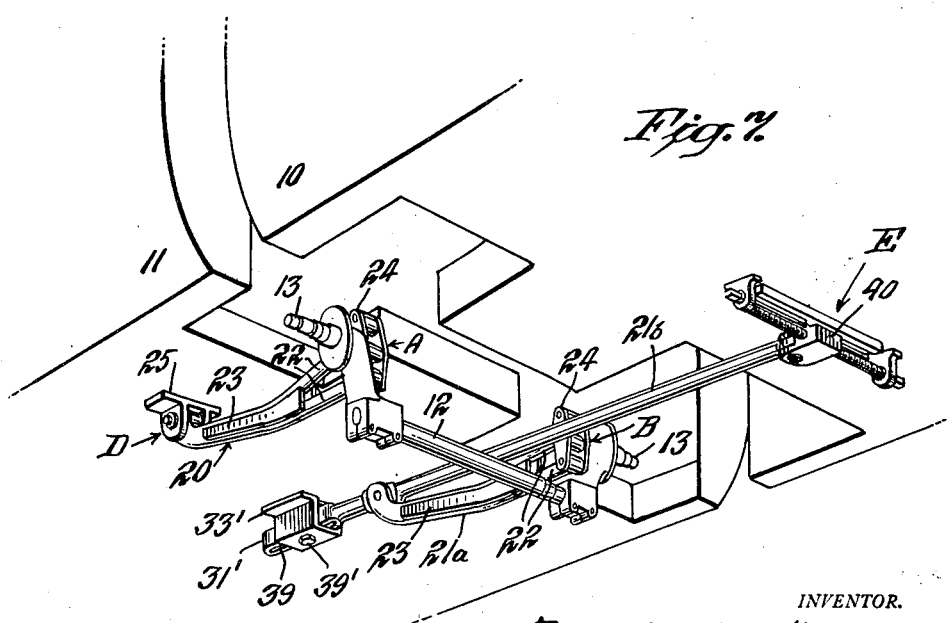

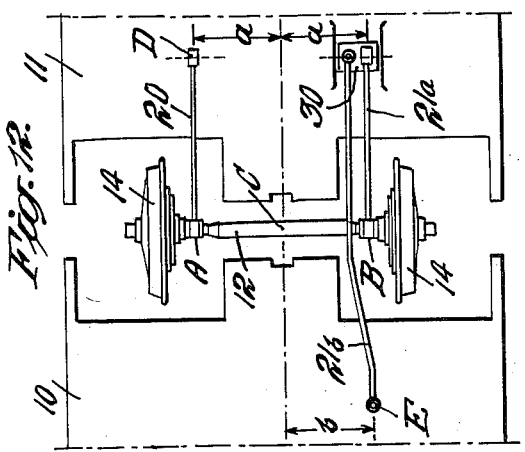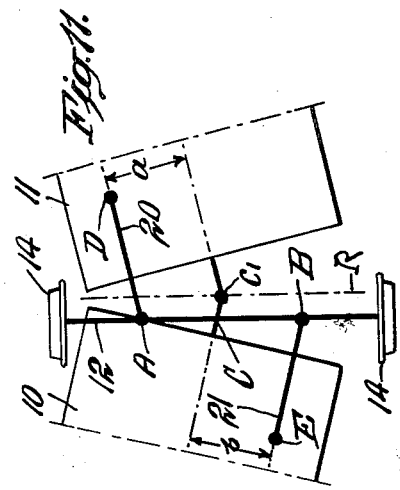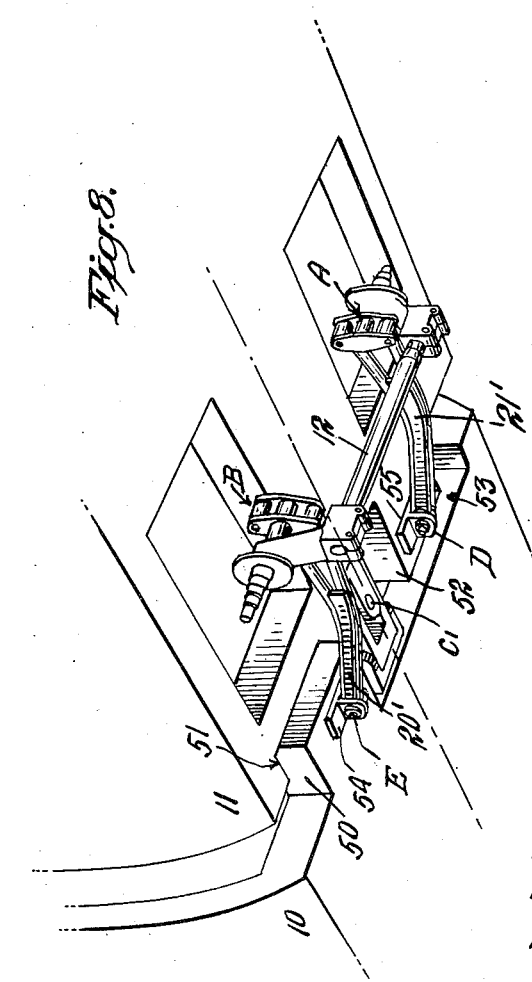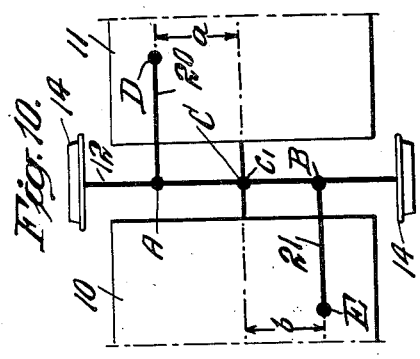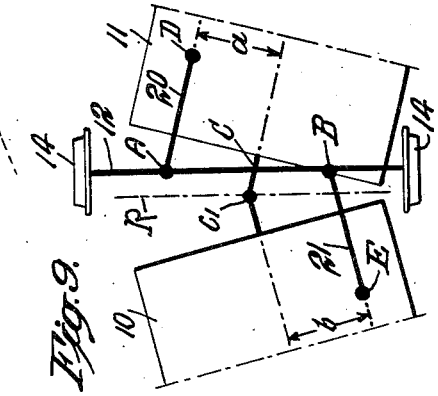

Feb. 26, 1957   F. M. F. HEREDIA   2,782,729
ARTICULATED RAILWAY TRAINS
Filed Oct. 15, 1952   6 Sheets-Sheet 6
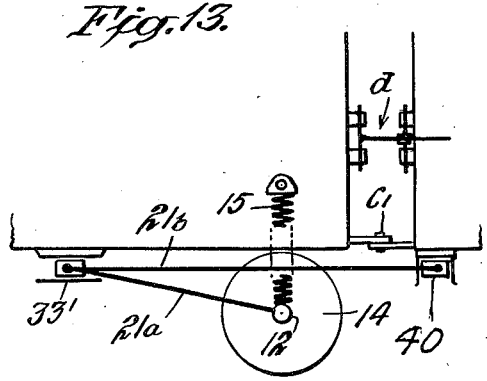
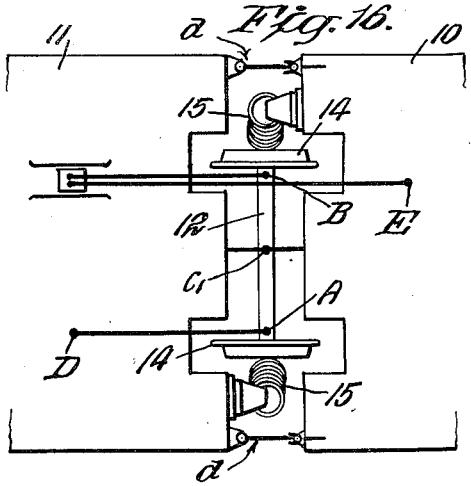
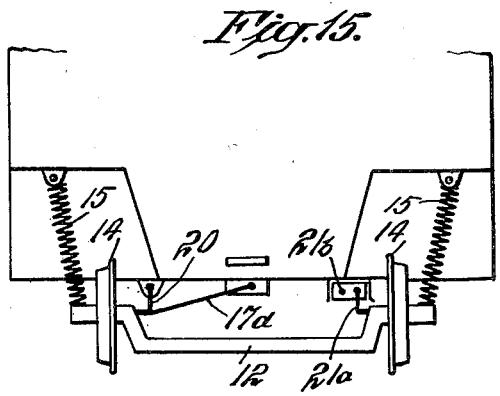
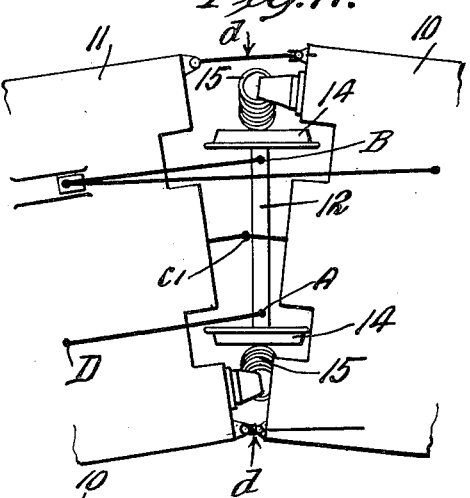
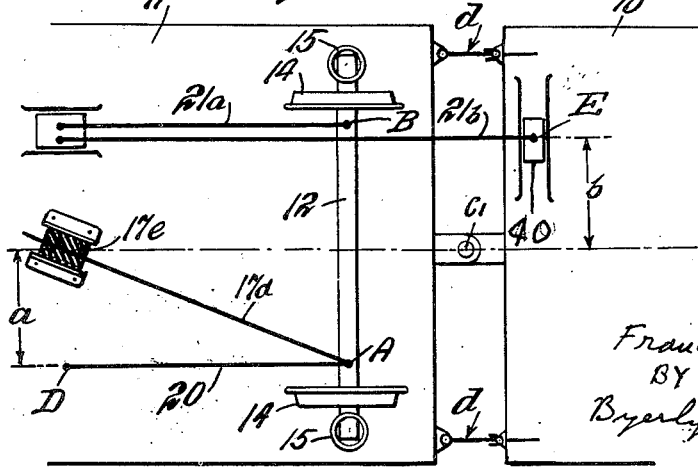
INVENTOR.
Francisco M. F. Heredia
BY
Byerly, Townsend & Watson
ATTORNEYS United States Patent Office 2,782,729
Patented Feb. 26, 1957

2,782,729
ARTICULATED RAILWAY TRAINS
Francisco M. F. Heredia, Madrid, Spain, assignor to Patentes Talgo, S. A., Madrid, Spain, a corporation of Spain Application October 15, 1952, Serial No. 314,813
32 Claims. (Cl. 105—4)

This invention relates to articulated railway trains consisting of a series of cars connected by vertical pivots. The object of the invention is to guide the wheels of such a train so as to secure minimum tractive effort with maximum safety and comfort.

The customary use in railway vehicles of freely pivoted four-wheel bogies increases the required traction effort by failing to keep the wheels parallel to the rails and also carries a danger of derailment by allowing the wheels to attack the rail at a positive angle at the outside of a curve so that they tend to climb over the rail.

In articulated railway vehicles, the provision of a single pair of wheels located near the rear end of each car and held perpendicular to the axis of the car does away with some of the disadvantages of a pivoted bogie. In this case, the outer wheel attacks the outer rail at a negative angle on curves when the train is rounding a curve at high speed and thus reduces the danger of derailment under these conditions. Unless the cars are made very short, the angle of attack may be sufficient to cause an undesirable increase in the tractive effort required to move the train around a curve, and even when short cars are used some tractive effort is wasted. Furthermore, such trains are not reversible.

In order to provide both for maximum tractive effort and for maximum safety, I find that the wheels of a railway train should be steered in such a way that the wheels are always parallel to the rails except in conditions where there is danger of derailment, and in such conditions the outer wheels should attack the outer rails at very small negative angles when the train is running in either direction. My invention provides a steering mechanism which guides the wheels of an articulated railway train in this manner.

According to the invention, guiding of the wheels of an articulated train is secured in a simple, practical and inexpensive way by a connection at one side of the train between each two-wheel running gear and the car ahead of it and a connection at the other side of the train between each running gear and the car behind it. By these connections, one end portion of each wheel axle is held in fixed longitudinal relation to one car, while the other end portion of the axle is held in fixed longitudinal relation to the adjacent car. The spring suspension supporting the car bodies on the running gears and centering means for the running gears are arranged to permit longitudinal displacement between each end portion of the axle and one of the two cars, and to allow longitudinal displacement between the middle point of the axle and both of the cars. Such displacements, while essential to the operation of the guiding connections, are small in extent.

An important feature of the invention consists in providing guiding connections which allow vertical and lateral movement of the car bodies on their springs without any angular movement of the axle. This is accomplished by including in the guiding connections for each axle a pair of radius rods which form a parallelogram with the axle and the body of the train.

The guiding connections serve to keep the wheels parallel to the rails on straight and curved tracks, whether or not the cars are of the same length and whether or not the running gears are located at the articulation points. They provide a small negative angle of attack on the outer rail on entering curves, the condition of greatest danger of derailment, and may be adjusted to provide a small angle of attack throughout curves when the train is running in either direction.

In order to make clear the nature of my invention, I will describe its application to an articulated train of two-wheel cars of the general type shown in Omar Patent No. 2,462,666, although it should be understood that the invention is by no means limited to use in connection with such a train. In describing the invention, I shall refer to the accompanying drawings, in which:

Fig. 3 is a top view of the end portion of two of the articulated cars;

Fig. 3a is a fragmentary perspective view of a part of the centering mechanism;

Figs. 4, 5, 6, 7 and 8 are perspective bottom views of two adjacent cars showing various modifications of the wheel-steering mechanism and omitting the wheels, springs and centering means for the sake of clearness;

Figs. 9, 10 and 11 are diagrams showing the principle of the steering mechanism;

Fig. 12 is a diagram showing a steering mechanism including a jointed rod and incorporating parallelogram radius rods;

Figs. 13, 14 and 15 are diagrammatic views showing a modified steering mechanism, Fig. 13 being an elevation of the end portion of two of the cars, Fig. 14 a bottom view, and Fig. 15 an end view of one of the cars; and Figs. 16 and 17 are diagrammatic plan views of the adjacent ends of two articulated cars and showing a modified form of spring suspension.

Figure 1:
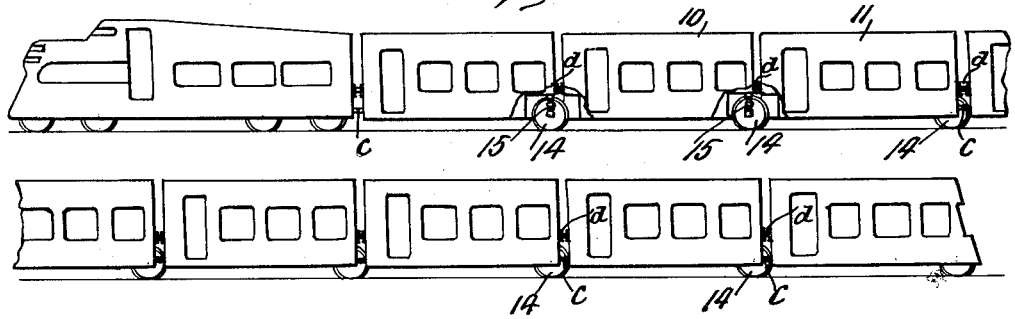
Fig. 1 is a side view of an articulated train of two-wheel cars.
Figure 2:
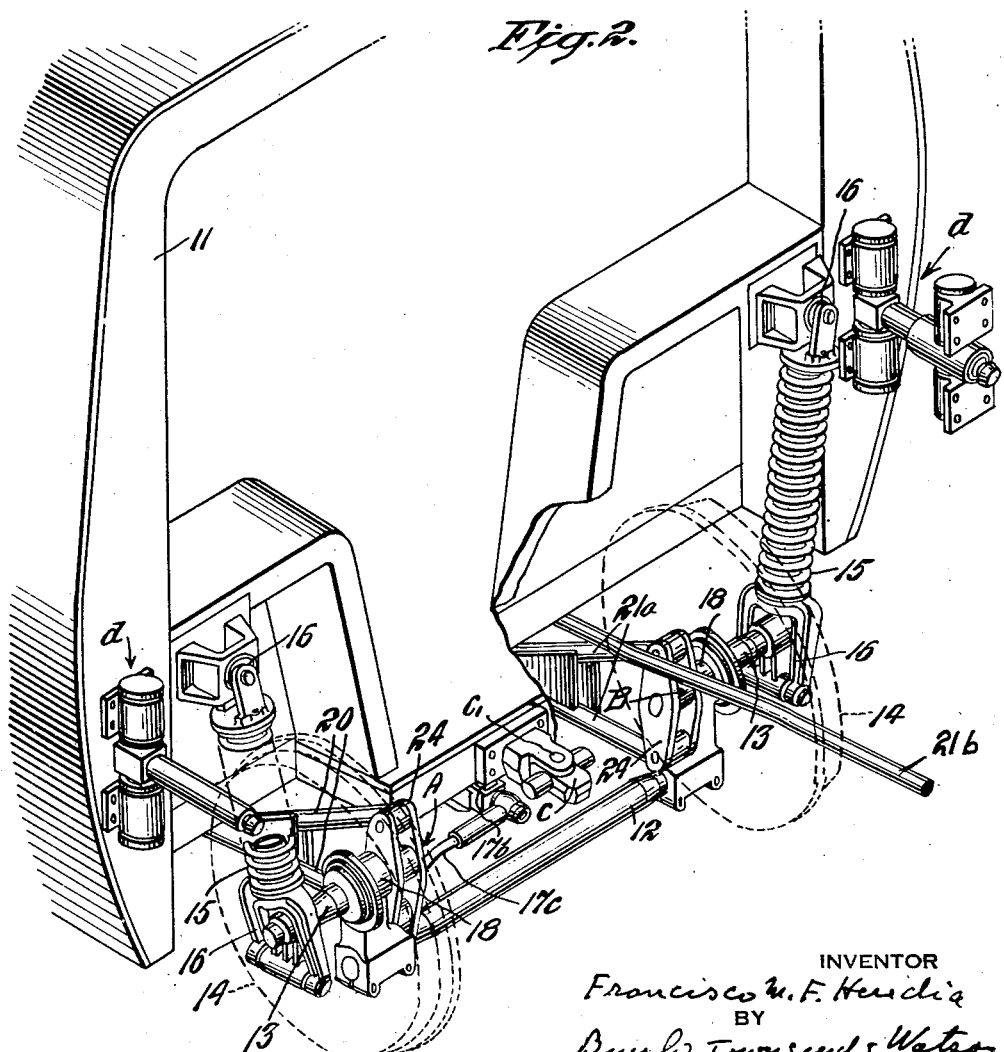
Fig. 2 is a perspective end view of one of the cars.

The construction of the illustrative train shown in Figs. 1, 2 and 3 will first be described. It consists of a number of cars each having a rigid car body. The car bodies (two of which are identified at 10 and 11) are connected by traction couplings $c$, each of which includes a vertical pivot $c_1$. The car bodies may also be connected by pivoted lateral sliding weight-bearing and aligning connections $d$ of the type shown in said Omar patent.

The car bodies are supported on running gears each of which consists of a drop center dead axle 12, having at its ends spindles 13 on which the wheels 14 are mounted. The weight of the end portions of adjacent cars is carried on one of the dead axles by a spring suspension which, in the form shown, consists of substantially vertical spring struts 15 with universal joints 16 at their ends. Relative lateral movement of the car bodies and the wheels is resisted by a centering device 17a, 17b, 17c.

The angular position of the axles in the train is determined by a steering mechanism which includes rods 20, 21a secured to each axle at points A and B near its ends. Inward extensions 18 of the wheel spindles 13 provide convenient points of attachment for these rods. Before describing the construction of the steering mechanism, I will explain the principle upon which it operates:

*Principle of steering connections.*—The basic principle of the invention is shown in the diagrams, Figs. 9, 10 and 11, which illustrate two car bodies 10 and 11 and a running gear including an axle 12 and wheels 14. The two car bodies are connected by a vertical pivot $c_1$. Steering of the wheels is effected by two inextensible connections or rods 20, 21. The rod 20 maintains a fixed distance between a point A of the axle 12 at the left side of its middle point C and a point D of the car body 11 located at a distance *a* to the left of the axis of this car body. The rod 21 maintains a fixed distance between a point B located at the right side of the middle point C and a point E of the car body 10 located at a distance *b* to the right of the axis of this car body. (The terms "right" and "left" are used for convenience in description but are used in a relative sense only as the train is reversible.)

When the train is on a track curving to the right as shown in Fig. 9, the middle point C of the axle is moved forward with respect to both car bodies, while the point A is moved with respect to the car body 10 only. When the train is on a track curving to the left as shown in Fig. 11, the middle point C is moved rearwardly with respect to both car bodies and the point B is displaced with respect to the car body 11. In both cases, the axle is maintained parallel to the line R which bisects the angle between the ends of the car bodies and is a radius of the curve which the train is rounding.

It should be understood that the angle between the axes of the car bodies in rounding curves is greatly exaggerated in Figs. 9 and 11 and that this greatly exaggerates the extent of the fore and aft movement of the axle caused by the rods 20 and 21. In actual practice, the amount of this movement is only a few centimeters.

In considering the operation of the mechanism described, it should be noted that, especially when the car bodies are short, the sharpest curves allowed on railroads cause only a small angle between the axes of adjacent cars. This angle is ordinarily less than one degree and never exceeds one and one-half degrees. The length of the connections 20 and 21 is so great that the angular turning of these rods when the train rounds a curve is insignificant and may be disregarded without appreciable error. In the actual trains in which the steering mechanism has been employed, the lengths of the connections which correspond to the connections 20 and 21 have a length of the order of one meter, but this length is not critical. Since the angular movement of the connections is so slight that it may be disregarded, the angular displacement of the axle 12 when the train is rounding a curve may be computed by considering merely the endwise displacement of the connections 20 and 21 which depends upon the distances *a*, *b* from the points D and E to the axis of the train.

In the case illustrated in Figs. 9 to 11 in which the axle is normally directly under the pivot $c_1$ and in which the two car bodies are of the same length, the wheels are maintained parallel to the track by positioning the points D and E so that the distances *a* and *b* are equal. The same result may be achieved under other conditions by adjustment of the ratio between the distances *a* and *b*. Thus, if the distance of the axle from the pivot point $c_1$ is *m* and the axle is located under the car body 10 and each car has the length L, the ratio of *b* to *a* required to maintain the wheels parallel to the track is $$\frac{L-2m}{L}$$

In the case where the axle is at the articulation point and the car bodies are of different lengths, the axle is maintained on the radius of the curve in the track by making the ratio of *b* to *a* equal to $$\frac{2L_1}{L_1+L_2}$$

where $L_1$ is the length of the car body 11, and $L_2$ the length of the car body 10.

*Incorporation of parallelogram arrangement.*—An important feature of the invention consists in preventing vertical and lateral movement of the car bodies on their springs from affecting the angular position of the axles. This is achieved by incorporating into a steering mechanism of the type described a pair of radius rods which form a parallelogram with the axle and a transverse line of one of the car bodies. In accordance with the invention, this is achieved either by use of a folded jointed connection at one side of the train or by the use of overlapping rod connections at the adjacent ends of the two car bodies.

*Folded jointed connection.*—The principle of the folded jointed connection is illustrated in Fig. 12. In this arrangement, the point A is maintained at a fixed distance from the point D of the car body 11 by an inextensible rod 20 as before. The point B at the other side of the axle is connected to the point E of the car body 10 by a jointed connection consisting of a radius rod 21*a* connected to the axle at the point B and a steering rod 21*b* connected to the car body 10 at the point E. The radius rod 21*a* is parallel to the rod 20 and of the same length. The free ends of this radius rod 21*a* and the steering rod 21*b* are connected by a pivotal joint 30.

The joint 30 between the rods 21*a* and 21*b* is mounted on the car body 11 at the distance *a* from the axis of this car body, and means are provided for permitting this joint to have a short longitudinal movement on the car body 11. This means may take a number of different forms as shown in Figs. 4, 5 and 6.

In the construction shown in Fig. 4, each of the radius rods 20, 21*a* consists of two rigid tubes 22 joined by side pieces 23. At one end of each rod the tubes 22 are spaced and connected by a double link 24 which is mounted on a rearward extension of the wheel spindle 13 of the dead axle 12. The rod 20 is pivoted at its other end to a bracket 25 located at the point D of the car body 11. The steering rod 21*b* is pivoted to a bracket 26 at the point E of the car body 10. The joint 30 between the rods 21*a* and 21*b* and the mounting of this joint are constructed as follows: A slide 31 is located between two depending flanges 32 of a bracket 33 secured to the bottom of the car body 11. The flanges 32 are provided with slots 34 which are engaged by studs 35 in the ends of the slide 30 so that the slide may move fore and aft on the car body 11. The ends of the rod 21*a* and the rod 21*b* are pivoted on the slide 31 and this constitutes the joint between the two rods.

The arrangement shown in Fig. 5 is similar except that the slide takes the form of a long rocker arm 36 pivoted to the bottom of the car 11 at 37 and having its free end in a longitudinal guide 38 secured to the bottom of the car body.

In the arrangement shown in Figs. 6 and 7, the radius rod 21*a* is pivoted directly to the steering rod 21*b*. The steering rod is extended beyond the pivot and slidably mounted on the bottom of the car body 11. The end of the steering rod has an enlarged portion 31' containing a vertical slot 39 and fits loosely in the guideway 33' secured on the bottom of the car 11. A pivot 39' extending through the guideway engages the slot 39 in the rod. The inner end portion of the rod 21*b* thus constitutes an element slidably mounted on the car 11, to which the radius rod 21*a* is pivotably connected and to which the extending part of the rod 21*b* is integrally connected.

In each of the specific arrangements which has been described, the folded jointed connection 21*a*, 21*b* is made inextensible between the points E and B which it connects by constraining the joint 30 so that it can move only substantially along an extension of a straight line connecting the two ends of the folded connection. Thus in Fig. 12, it is evident that the joint 30 is constrained to move along an extension of a straight line from E to B. This is also true of the joint in the folded connections shown in Figs. 4, 5, 6 and 7. This constraint of the joint prevents the folded connection from unfolding and thus makes it inextensible between the points E and B to which its ends are attached so that it maintains a substantially fixed longitudinal distance between these points so that the operation in the steering of the wheels is the same as that described in connection with Figs. 9, 10 and 11. At the same time, the connection incorporates a pair of radius rods forming a parallelogram with the axle and a transverse line of the car body 11 passing through the point D, so that vertical or lateral movements of the car bodies on their springs cause equal displacements of the two ends of the axle and do not change its angular position.

Another advantage of the jointed connection which has been described is that it permits making both of the radius rods 20, 21a extend away from the end of the car so that, in spite of the considerable length of these rods, the axle may be placed as nearly as desired at the end of the car in order to avoid the side swing of the ends of the cars which would occur if the cars had a considerable overhang beyond the axle.

A modified form of jointed rod steering connection is shown in Figs. 13 to 15 and Fig. 7. In this case, the axle 12 is located at a distance from the traction pivot $c_1$ so that the entire running gear, spring suspension and steering mechanism are located under the car body 11 with only the outer end of the steering rod 21b extending beyond this car body. The end of the steering rod 21b is pivoted to a transverse slide 40 on the bottom of the car body 10 so that the distance b may be varied. The slide may take the form of a self-locking nut on a screw as shown in Fig. 7.

This provision for easy adjustment of the distance b has several advantages. In the first place, it facilitates connection of cars of different lengths as the slide 40 may be set in accordance with the lengths of the cars so as to maintain the wheels parallel to the track. A further advantage of the adjustable slide 40 is that it permits setting the steering mechanism so as to make the outer wheel attack the track at a negative angle throughout a curve when this is desirable. When the train is to be operated on curves at high speed and is running in a direction in which the car body 11 precedes the car body 10, setting the slide 40 somewhat nearer the axis than the position required to keep the wheels parallel to the track will result in making the wheels attack the track at a small negative angle on curves so that the friction between the wheel flange and the rail holds the wheel down and eliminates danger of derailment. The same result is obtained when the train is running in a direction in which the car body 10 precedes the car body 11 by setting the slide 40 somewhat further from the axis of the car than the position required to maintain parallelism between the wheels and the track.

*Overlapping rod connections.*—It is not necessary to use the jointed rod connection which has been described in order to incorporate parallelogram radius rods in the steering mechanism. An alternative arrangement is illustrated in Fig. 8. The car bodies 10 and 11 are provided with transversely aligned rod connections at opposite sides of the axis of the train. At one side of the axis of the train, the floor of the car 10 has a projection 50 extending into a recess 51 in the floor of the car 11. At the other side of the axis of the train, the floor of the car 11 has a projection 52 extending into a recess 53 provided in the floor of the car 10. The projections 50 and 52 extend across the transverse plane of the train which contains the traction pivot $c_1$. Brackets 54 and 55 which determine the position of the points D and E are secured to the projections 50 and 52 and lie on a common transverse line of the train, which in the form shown is the line on which the traction pivot is located. The axle 12 of the running gear is located at a distance from the traction pivot and has its points A and B connected to the point D of the car body 11 and the point E of the car body 10 by two rods 20', 21' which form a parallelogram with the axle and the transverse line of the car body, and at the same time they serve to maintain a fixed distance between the point A of the axle and the point D of the car body 11 and a fixed distance between the point B of the axle and the point E of the car body 10. Thus, the steering operation of the rods is the same as that of the rods 20, 21 of Figs. 9, 10 and 11, while at the same time the parallelogram effect which prevents spring-borne movements of the car bodies from affecting the angle of the axle is obtained.

*Provision for required relative movements.*—As pointed out in connection with Figs. 9 to 11, the operation of the steering mechanism involves relative fore and aft movement between each end of the axle and one of the car bodies and fore and aft movement between the middle point of the axle and both car bodies. The axle centering means and the spring suspension are arranged to permit the required movements.

The centering means shown in Figs. 3 and 3a consist of a torsion rod 17a mounted on the car body 11 and having a depending arm 17b attached to the axle by a link 17c. The link is secured to the axle at or near the point A so that the centering means in no way interferes with relative fore and aft movement between the point B near the other end of the axle and the car body 11 on which the centering means is mounted. The centering means shown in Fig. 14 consists of a slightly flexible rod 17d mounted between rubber blocks 17e secured to the bottom of the car body 11. The outer end of the rod 17d is pivotably attached to the axle at or near the point A so that it cannot interfere with longitudinal displacement of the point B with respect to the car body 11. Other types of centering means may be used, it being practical merely that the centering means be attached to the axle near the end of the axle which is maintained in fixed relation to the car body on which the centering means is mounted.

A spring suspension in the form of a long, nearly vertical spring strut 15, such as that illustrated, permits longitudinal displacement between the end of the axle on which the strut is secured and the car body supported on the strut. It is to be noted, however, that one end of each axle is longitudinally fixed in relation to the car body supported on it so that the vertical spring strut arrangement which has been described is not required at this end of the axle. However, it is, of course, desirable to use the same type of spring suspension at each side of the train.

It is not essential to use a spring suspension which permits fore and aft movement between its upper and lower ends. Figs. 16 and 17 show a steering linkage of the jointed type which has been described and a running gear located at the articulation point of two cars. The left side of the car body 10 is spring supported on the end of the axle near the point B, while the right side of the car body 11 is spring supported on the end of the axle near the point A. Each spring thus connects a car body to an end of the axle which is maintained in fixed longitudinal relation to this car body. It follows that, when the train rounds a curve as shown in Fig. 17, each spring remains in a vertical position. This non-symmetrical form of suspension is practicable because of the lateral weight-bearing sliding connections d between the two car bodies.

This application is a continuation-in-part of my co-pending application Serial No. 272,915, filed February 23, 1952, now abandoned.

What I claim is:

1. In an articulated train having pivoted car bodies mounted on two-wheel running gears, wheel-steering mechanism comprising inextensible connections lying wholly at one side of the axis of the train and connecting a point of each running gear at this side of the train axis with a point of the car body behind it lying at this side of the train axis, independent inextensible connections lying wholly at the other side of the axis of the train and connecting a point of each running gear located at that side of the train axis with a point of the car body ahead of it located at that side of the train axis.

2. In a train, the combination with two articulated car bodies and a two-wheel running gear, of an inextensible connection at the right side of the train between a point at the right side of the running gear and a point of one of the car bodies located at a predetermined distance to the right of its axis, and an inextensible connection at the left side of the train between a corresponding point at the left side of the running gear and a point of the other car body located at a predetermined distance to the left of its axis.

3. In a train, the combination with two articulated car bodies of the same length and a two-wheel running gear located at the articulation point, of an inextensible connection at the right side of the train between a point at the right side of the running gear and a point of one of the car bodies located at a predetermined distance to the right of its axis, and an inextensible connection at the left side of the train between a corresponding point at the left side of the running gear and a point of the other car body located at the same predetermined distance to the left of its axis.

4. In a train, the combination with two articulated car bodies of the same length L and a two-wheel running gear located under one of the car bodies at a distance $m$ from the articulation point, of an inextensible connection at the right side of the train between a point at the right side of the running gear and a point of the one of the car bodies on which it is located at a distance $a$ to the right of its axis, and an inextensible connection at the left side of the train between a corresponding point at the left side of the running gear and a point of the other car body located at a distance $$a \cdot \frac{L-2m}{L}$$

to the left of its axis.

5. In a train, the combination with two articulated car bodies of different lengths $L_1$, $L_2$ and a two-wheel running gear located at the articulation point, of an inextensible connection at one side of the train between a point of the running gear and a point of the car body of length $L_1$ located at a distance $a$ from its axis, and an inextensible connection at the other side of the train between a corresponding point of the running gear and a point of the other car body located at a distance $$a \cdot \frac{2L_1}{L_1+L_2}$$

from its axis.

6. Wheel-steering mechanism as claimed in claim 1, in which the inextensible connections at both sides of the axis of the train are of sufficient length to be free from significant angular movement when a train rounds a curve.

7. Wheel-steering mechanism as claimed in claim 2, in which said inextensible connections include a pair of rods forming a parallelogram with the axle of the running gear and a transverse line of the train.

8. In a train, the combination with two articulated car bodies and a two-wheel running gear, of an inextensible connection between a point at the right side of the running gear and a point at the right side of the first car body consisting of a single longitudinal rod, a folded jointed connection between a point at the left side of the running gear and a point at the left side of the second car body consisting of two longitudinal rods, and a slidable mounting for the joint on the first car body constraining said joint to movement along an extension of a straight line through said two points so that said connection is inextensible between said two points.

9. In a train, the combination with two articulated car bodies and a two-wheel running gear, of an inextensible connection between a point at the right side of the running gear and a point at the right side of one of the car bodies consisting of a radius rod, a fold jointed connection between a point at the left side of the running gear and a point at the left side of the other car body, said folded jointed connection consisting of two longitudinal rods, and a sliding mounting for the joint of the connection on the first car constraining said joint to movement along an extension of a straight line through said two points, one of the rods of the folded jointed connection being a radius forming a parallelogram with the first radius rod, the axle and a transverse line of the train.

10. In a train, the combination with two articulated car bodies and a running gear having an axle and two wheels, of a steering rod extending between the two car bodies at one side of the axis of the train with one of its ends fixed to the second car body and the other of its ends slidably mounted on the first car body, a pair of parallel radius rods connected to the axle of the running gear, a pivotal mounting for one of said radius rods on the first car body, and a pivotal mounting for the other of said radius rods on said steering rod.

11. In a train, the combination with two articulated car bodies and a running gear having an axle and two wheels, of a pair of parallel radius rods connecting the axle to one of the car bodies, one of said radius rods being mounted on said car body for longitudinal sliding movement, a steering rod connected at one end to said slidably mounted radius rod, and means on the other car body for mounting the other end of the steering rod at a number of different distances from the axis of the car body.

12. In a train, the combination with two articulated car bodies and a running gear having an axle and two wheels, of a pair of radius rods connecting the axle to one of the car bodies, one of said rods having a sliding mounting on said car body, a steering rod connected at one end to the slidably mounted rod, a transversely movable element on the other car body carrying the other end of the steering rod, and means for locking said transversely movable element in a number of positions at different distances from the axis of the car body.

13. In a train, the combination with two articulated car bodies having at their adjacent ends overlapping projections at opposite sides of the train, a running gear including an axle and two wheels, and steering connections consisting of two parallel rods of the same length extending from points at opposite sides of the running gear to transversely aligned points of said overlapping projections, so that the two rods form a parallelogram with the axle and a transverse line of the train and serve to maintain the point at one side of the running gear in substantially fixed longitudinal relation to one of the car bodies and the point at the other side of the running gear in substantially fixed longitudinal relation to the other car body.

14. The combination claimed in claim 2, in which a spring suspension mounting at least one of the car bodies on the running gear and centering means for the axle are both arranged to permit longitudinal displacement of the left side of the running gear with respect to the first car body, of the right side of the running gear with respect to the second car body and of the middle of the running gear with respect to both car bodies.

15. An articulated train as claimed in claim 1, in which the mounting of the car bodies on the running gear consists of spring suspensions permitting fore and aft displacement of the running gears in the train.

16. In a train, the combination with two articulated car bodies and a running gear including two wheels and an axle, of lateral weight-bearing and aligning connections between the adjacent ends of the two car bodies, a spring suspension mounting one corner of one car body on one end of the axle and the other corner of the other car body on the other end of the axle, and steering mechanism including an inextensible longitudinal connection between a point at one end portion of the axle and the car body which is supported on this end of the axle and an inextensible longitudinal connection between a point at the other end portion of the axle and the other car body which is supported on this end of the axle.

17. In a train, the combination with two articulated car bodies and a two-wheel running gear, of a steering connection between the right side of the running gear and one of the car bodies and a steering connection between the left side of the running gear and the other car body, and resilient axle centering means mounted on one of the car bodies and secured to the axle near the end of the axle which is connected to this car body by one of the steering connections.

18. A railway car having a body and a running gear including an axle, a spring suspension supporting the body on the running gear and permitting horizontal movement of the running gear with respect to the body, a resilient centering connection between the body and the running gear arranged to permit fore and aft movement of the right end of the running gear with respect to the body, a radius rod connecting a point of the running gear near the left end of the axle to the body to maintain this point of the running gear in fixed longitudinal relation to the body, a parallel radius rod connected to the running gear near the right end of the axle, an element connected to this radius rod and mounted on the body for longitudinal movement, and a steering rod connected to said element and projecting beyond the end of the car for attachment to an adjacent car.

19. A railway car having a body and a running gear including an axle near one end of the car, a pair of parallel radius rods connected to points of the running gear near the ends of the axle and extending away from the end of the car toward the middle of the car, an element connected to one radius rod and mounted on the car body for longitudinal movement, and a steering rod connected to this element and extending across the axle of the running gear for attachment to an adjacent car.

20. An articulated train including two articulated car bodies, a running gear including an axle, a spring suspension supporting adjacent ends of both car bodies on the running gear and permitting fore and aft movement of the axle, a centering means for the axle connected to one of the car bodies, and a wheel-steering mechanism consisting of a connection between a point at one side of the running gear and one of the car bodies to maintain this point of the running gear in substantially fixed longitudinal relation with this car body, and a connection between a point at the other side of the running gear and the other car body to maintain that point of the running gear in substantially fixed longitudinal relation to that car body.

21. An articulated train as claimed in claim 20, in which each connection between the running gear and a car body connects a point of the axle at a distance from its middle point to a point of the car body at the same distance from the axis of the car body and on the same side of the train, and maintains a substantially fixed distance between these two points.

22. An articulated train as claimed in claim 20, in which each connection between the running gear and a car body consists of a rod extending parallel to the axis of the train.

23. An articulated train as claimed in claim 20, in which each connection between the running gear and a car body consists of a rod extending parallel to the axis of the car body when the train is on a straight track and of such length that it remains substantially parallel to the axis of the car body when the train is on a curved track.

24. An articulated train as claimed in claim 20, in which the connection between the running gear and the first car body consists of a rod pivoted at one end at a point of the axle spaced from its middle point and at the other end at a point of the first car body equally spaced from the axis of the car body, the connection between the running gear and the second car body consists of a jointed rod pivoted at one end to the running gear at a point spaced from the middle point of the axle and at the other end to the second car body at a point equally spaced from the axis of the car body, and the joint of the rod is slidably mounted on the first car body for movement substantially parallel to the axis of the first car body.

25. An articulated train as claimed in claim 20, in which the spring suspension permits only slight vertical movements of the car bodies, and each connection between the running gear and a car body consists of a longitudinal rod pivoted at one end to running gear at a point spaced from the middle point of the axle and at the other end to the car body at a point equally spaced from the axis of the car body.

26. An articulated train as claimed in claim 20, in which the spring suspension provides only a slight vertical movement of the car bodies, the centering means maintains the middle point of the axle substantially on the axis of one of the car bodies, and each connection between the running gear and a car body consists of a longitudinal rod pivoted at one end to the running gear at a point spaced from the middle point of the axle and at the other end to the car body at a point equally spaced from the axis of the car body.

27. An articulated train including two articulated car bodies 10 and 11, a running gear including an axle, a spring suspension supporting adjacent ends of both car bodies on the running gear and permitting fore and aft movement of the axle, a centering means for the axle connected to one of the car bodies, and a wheel-steering mechanism consisting of a connection at one side of the axis of the train maintaining a substantially fixed horizontal distance between a point of the axle at a distance $a$ from its middle point and a point of the car body 11 at a distance $a$ from its axis, and a connection at the other side of the axis of the train maintaining a substantially fixed horizontal distance between a point of the axle at a distance $a$ from its middle point and a point of the car body 10 at a distance $b$ from its axis, the ratio of the distance $b$ to the distance $a$ being the same as the ratio of the length of the car body 11 to the average length of the two car bodies.

28. An articulated train as claimed in claim 27, in which the car bodies 10 and 11 are of different lengths, the connection between the running gear and the car body 11 consists of a rod pivoted at one end to a point of the axle spaced at a distance $a$ from its middle point and at the other end to a point of the car body 11 spaced at a distance $a$ from the axis of the car body, the connection between the running gear and the car body 10 consists of a jointed rod pivoted at one end to the running gear at a point spaced at a distance $a$ from the middle point of the axle and at the other end to the car body 10 at a point spaced at a distance $b$ from the axis of the car body, and the joint of the rod is slidably mounted on the car body 11 at a distance $a$ from the axis of the car body for movement substantially parallel to the axis.

29. An articulated train as claimed in claim 27, in which the spring suspension permits substantial vertical movement of the car bodies, the connections between the running gear and the car bodies incorporating parallel radius rods which are actuated by relative vertical movements of the car bodies to cause variations in the horizontal distance between one side of the running gear and the first car body and equal and opposite variations in the distance between the other side of the running gear and the second car body.

30. An articulated train as claimed in claim 27, in which the spring suspension permits substantial vertical movements of the car bodies, the connection between the running gear and the first car body consists of a single longitudinal rod, and the connection between the running gear and the second car body consists of a jointed longitudinal rod and a slidable mounting for the joint of the rod on the first car body.

31. An articulated train as claimed in claim 27, in which the centering means permits substantial relative lateral movement between the car bodies and the running gear, the connection between the running gear and the first car body consists of a single longitudinal rod pivoted at one end at a point of the axle spaced from its middle point and at the other end at a point of the first car body equally spaced from its axis and the connection between the running gear and the second car body consists of a longitudinal slide mounted on the first car body, a rod section of the same length as the rod of the first connection pivoted at one end at a point of the axle spaced from its middle point at the same distance as the point of the axle to which the first connection is pivoted and pivoted at its other end to said slide, and a rod section pivoted at one end at a point on the second car body and at the other end to said slide.

32. An articulated train including two pivoted car bodies, a running gear including an axle, a spring suspension supporting adjacent ends of both car bodies on the running gear and permitting fore and aft movement of the axle, a centering means for the axle connected to one of the car bodies, wheel-steering mechanism consisting of a connection between the running gear and one of the car bodies at one side of the axis of the train and a connection between the running gear and the other car body at the other side of the axis of the train, and a number of brackets on one of the car bodies at different distances from its axis on any one of which the connection between it and the running gear may be mounted.

References Cited in the file of this patent

UNITED STATES PATENTS

| | | |
|---|---|---|
| 1,388,508 | Brilhart | Aug. 23, 1921 |
| 1,408,167 | Brilhart | Feb. 28, 1922 |
| 2,098,949 | Geissen | Nov. 16, 1937 |

FOREIGN PATENTS

| | | |
|---|---|---|
| 880,459 | France | Mar. 26, 1943 |
| 552,538 | Germany | June 15, 1932 |
| 45,504 | Netherlands | Apr. 15, 1939 |